Patented Apr. 17, 1928.

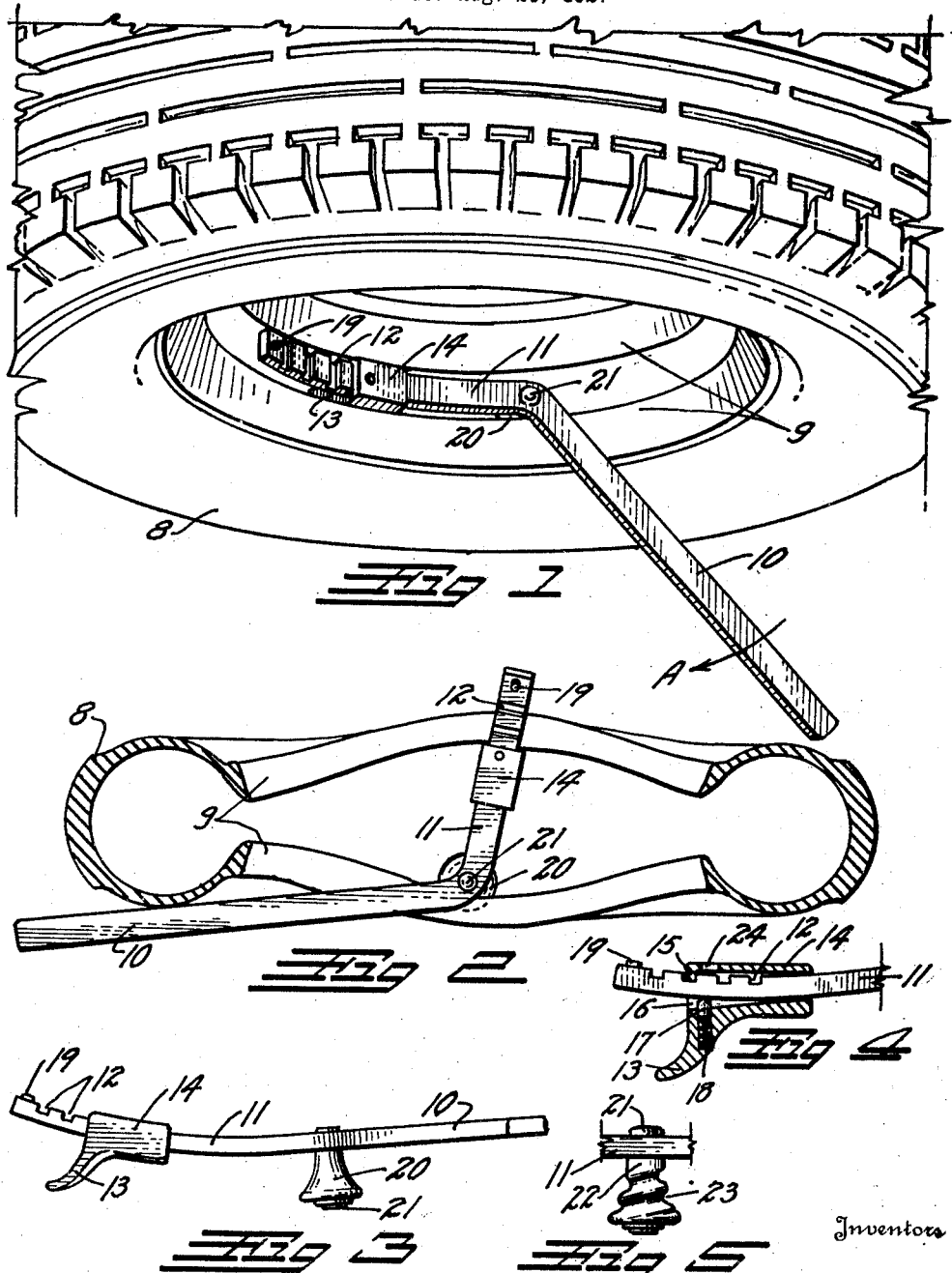

1,666,150

UNITED STATES PATENT OFFICE.

JOSEPH P. SHEVLIN AND STUART E. NORTON, OF DENVER, COLORADO.

TIRE-CASING SPREADER.

Application filed August 26, 1927. Serial No. 215,724.

This invention relates to a tool for use in spreading the beads of an automobile tire casing so that the interior of the casing may be inspected or repaired, and has for its principal object, the provision of a simple and efficient tool which can be easily operated in the heaviest and most rigid of tire casings.

Another object of the invention is to provide a casing spreader which will automatically lock itself so as to maintain the casing in the spread condition.

A further object is to so construct the spreader that it will be adjustable for differing sizes of casings.

A still further object is to provide means on the spreader which will cause it to work into the casing so as to eliminate any possibility of its slipping therefrom.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of a tire casing illustrating the invention in position ready to be operated.

Fig. 2 is a cross section through a tire casing illustrating the invention in the spread position.

Fig. 3 is an edge elevation of our improved tire casing spreader.

Fig. 4 is a detail view illustrating a cross section through the adjustable lug of the spreader.

Fig. 5 is a detail view of an alternate form of the conical spreading lug to be later described.

A pneumatic tire casing is illustrated at 8 with its beads at 9.

The invention comprises a handle 10 from which an arcuate spreading lever 11 projects at an obtuse angle. The lever 11 is curved from the plane of the handle to approximately conform to the internal diameter of the tire casing. On the concave face of the curved lever 11, a series of transverse notches 12 are formed which act to determine the positions of an adjustable lug 13.

The adjustable lug 13 is shown in detail in Fig. 4 and comprises a rectangular sleeve 14 adapted to surround the lever 11. Projecting inwardly from the sleeve 14 is a tongue 15 which engages in the notches 12. The passage in the sleeve 14 tapers as indicated at 16, so that the sleeve may be rocked upon the lever 11 to release the tongue 15 from the notches 12 so that it may be placed in any desired notch. The tongue is maintained in the notch by a plunger 17 which is carried by the lug 13 and is constantly forced against the concave side of the lever 11 by means of a spring 18. A projection 19 on the extremity of the lever 11 prevents the lug 13 from being entirely removed. At the angle between the handle 10 and the lever 11, a conical rotatable lug 20 is carried on an axle pivot 21.

In use, the tool is inserted in the casing 8, as shown in Fig. 1, with the lugs 13 and 20 extending into the space between the two beads 9 of the casing. The handle 10 is then swung, as indicated by the arrow "A", Fig. 1, to the position of Fig. 2. As the handle swings the conical lug 20 will roll along the interior face of one of the casing beads until the handle 10 comes into contact with the casing as shown in Fig. 2. The casing beads are now spread apart a distance equal to the original setting of the adjustable lug 13 so that its interior may be readily inspected or repaired.

It is desired to call attention to the fact that the curve of the lever 11 is an important feature for, were the lever straight, it would be impossible to turn it, since its extremity would be between the casing beads and would not pass thereover as is necessary to assume the position of Fig. 2. It is also desired to call attention to the fact that the obtuse angle between the handle 10 and the lever 11 is an important feature. This angle allows the tool to assume the position of Fig. 2, that is, with the lever resting beyond the center point of rotation when the handle is in contact with the casing. This causes the tool to be self-locking in the spread position. The tendency of the two beads is to press toward each other and, in so doing, they tend to swing the lever in a direction which only results in forcing the handle 10 more firmly against the casing without releasing the tool.

In Fig. 5, we have shown an alternate form for the conical lug. In this form, we provide a conical lug 22 on the face of which a relatively deep gradual spiral thread 23 is formed. The rotation of this lug acts to screw it into the casing and eliminates the possibilities of its slipping over the edge of the casing bead.

While specific forms of the improvement have been described and illustrated herein, it is desired to be understood that the same may be varied, within the scope of the appended claims, without departing from the spirit of the invention.

Having thus described the invention, what we claim and desire to secure by Letters Patent is:—

1. A tire casing spreader comprising a handle; a lever projecting from said handle; an adjustable lug carried by said lever and longitudinally movable thereon; means for locking said lug in a predetermined position on said lever; a second lug projecting from said handle, both of said lugs adapted to be placed between the beads of said casing, said means comprising a series of notches formed in one face of said lever; a tongue carried by said lug and adapted to engage said notches; and spring means arranged to maintain said tongue in said notches.

2. A tire casing spreader comprising a handle; a lever projecting from said handle at an obtuse angle therewith, said lever being curved to approximate the interior curve of said tire casing; an adjustable lug carried by said lever; a rotatable lug carried by said lever, said lugs adapted to extend between the beads of said casing; and a thread formed on said rotatable lug and adapted to work said lug toward said casing as said handle is swung.

3. In a tire casing spreader having lugs adapted to be inserted between the beads of said casing and arranged so that they may be swung from a longitudinal position to a lateral position therein; an axle for one of said lugs so that it may rotate thereabout; and a thread formed on the exterior of said latter lug to cause it to work into said casing.

4. A tire casing spreader comprising a handle; a lever projecting from said handle; a lug projecting adjacent the junction between said handle and said lever; a sleeve adapted to surround said lever; a second lug projecting from said sleeve, said sleeve being slidable upon said lever, and means for locking said sleeve in predetermined positions upon said lever.

5. A tire casing spreader comprising a handle; a lever projecting from said handle; a lug projecting adjacent the junction between said handle and said lever; a sleeve adapted to surround said lever; a second lug projecting from said sleeve, said sleeve being slidable upon said lever; means for locking said sleeve in predetermined positions upon said lever, and means on said lever for preventing the movement of said sleeve.

6. A tire casing spreader comprising a handle; a lever projecting from said handle; a lug projecting adjacent the junction between said handle and said lever; a sleeve adapted to surround said lever; a second lug projecting from said sleeve, said sleeve being slidable upon said lever; means for locking said sleeve in predetermined positions upon said lever, the opening in said sleeve for the reception of said lever being larger at one extremity than at the other; a tongue projecting inwardly into the enlarged portion of said opening notches in said lever adapted to receive said tongue and spring actuated means arranged to move said sleeve on said lever so as to maintain said tongue in any desired one of said notches.

In testimony whereof, we affix our signatures.

JOSEPH P. SHEVLIN.
STUART E. NORTON.